(12) United States Patent
Shen

(10) Patent No.: US 8,209,817 B2
(45) Date of Patent: Jul. 3, 2012

(54) HINGE AND COLLAPSIBLE DEVICE UTILIZING THE SAME

(75) Inventor: Wen-Bin Shen, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 413 days.

(21) Appl. No.: 12/546,695

(22) Filed: Aug. 25, 2009

(65) Prior Publication Data

US 2011/0016669 A1    Jan. 27, 2011

(30) Foreign Application Priority Data

Jul. 22, 2009 (CN) .................... 2009 2 0306613 U

(51) Int. Cl.
*E05C 17/64* (2006.01)
(52) U.S. Cl. .................. 16/342; 16/337; 361/679.27
(58) Field of Classification Search .............. 16/342, 16/337, 319, 374, 341, 386, 387; 379/433.13; 455/575.3; 361/679.27
See application file for complete search history.

(56) References Cited

U.S. PATENT DOCUMENTS

| | | | | |
|---|---|---|---|---|
| 4,986,507 A | * | 1/1991 | Chiang | 248/291.1 |
| 7,451,522 B2 | * | 11/2008 | Lu et al. | 16/342 |
| 7,895,711 B2 | * | 3/2011 | Shen | 16/342 |
| 2008/0312001 A1 | * | 12/2008 | Lee et al. | 464/180 |
| 2010/0146733 A1 | * | 6/2010 | Shen | 16/297 |
| 2011/0041289 A1 | * | 2/2011 | Shen | 16/342 |
| 2011/0072619 A1 | * | 3/2011 | Wang et al. | 16/339 |
| 2011/0131760 A1 | * | 6/2011 | Shen | 16/346 |
| 2011/0239408 A1 | * | 10/2011 | Chang | 16/386 |

* cited by examiner

*Primary Examiner* — William L. Miller
(74) *Attorney, Agent, or Firm* — Altis Law Group, Inc.

(57) ABSTRACT

A hinge includes a first connecting member, a shaft, a second connecting member, and a shaft sleeve unrotatably fixed to the second connecting member. The shaft is unrotatably fixed to the first connecting member, and includes a shaft body having a flat surface formed on a circumference of the shaft body. The second connecting member is rotatably mounted to the shaft body. The shaft sleeve defines a receiving hole for the shaft body rotatably passing therethrough. The shaft sleeve includes a flat resisting block resisting against the flat surface. When the second connecting member is rotated relative to the first connecting member, the resisting block is deformed, and slide onto the circumference of the shaft body from the flat surface.

14 Claims, 5 Drawing Sheets

HINGE AND COLLAPSIBLE DEVICE UTILIZING THE SAME

BACKGROUND

1. Technical Field

The disclosure relates to a hinge, and a collapsible device utilizing the same.

2. Description of Related Art

A collapsible device, such as a notebook computer or a clamshell mobile phone, generally includes a main body and a display hinged to the main body. The hinge allows the display to be rotatable with respect to the main body, and to be folded with the main body for saving space.

A hinge normally includes a first element and a second element fixed to the main body and the display of the collapsible device, respectively. The first and second elements are rotatable relative to and in friction engagement with each other for maintaining the display at any angle with respect to the main body. Generally, a hook extends from the display, and a slot is defined in the main body. When the display is closed to the main body, the hook engages in the slot for fixing the display to the main body. However, it is quite inconvenient and costly to use the hook and the slot in the collapsible device.

DETAILED DESCRIPTION

Figure 1:
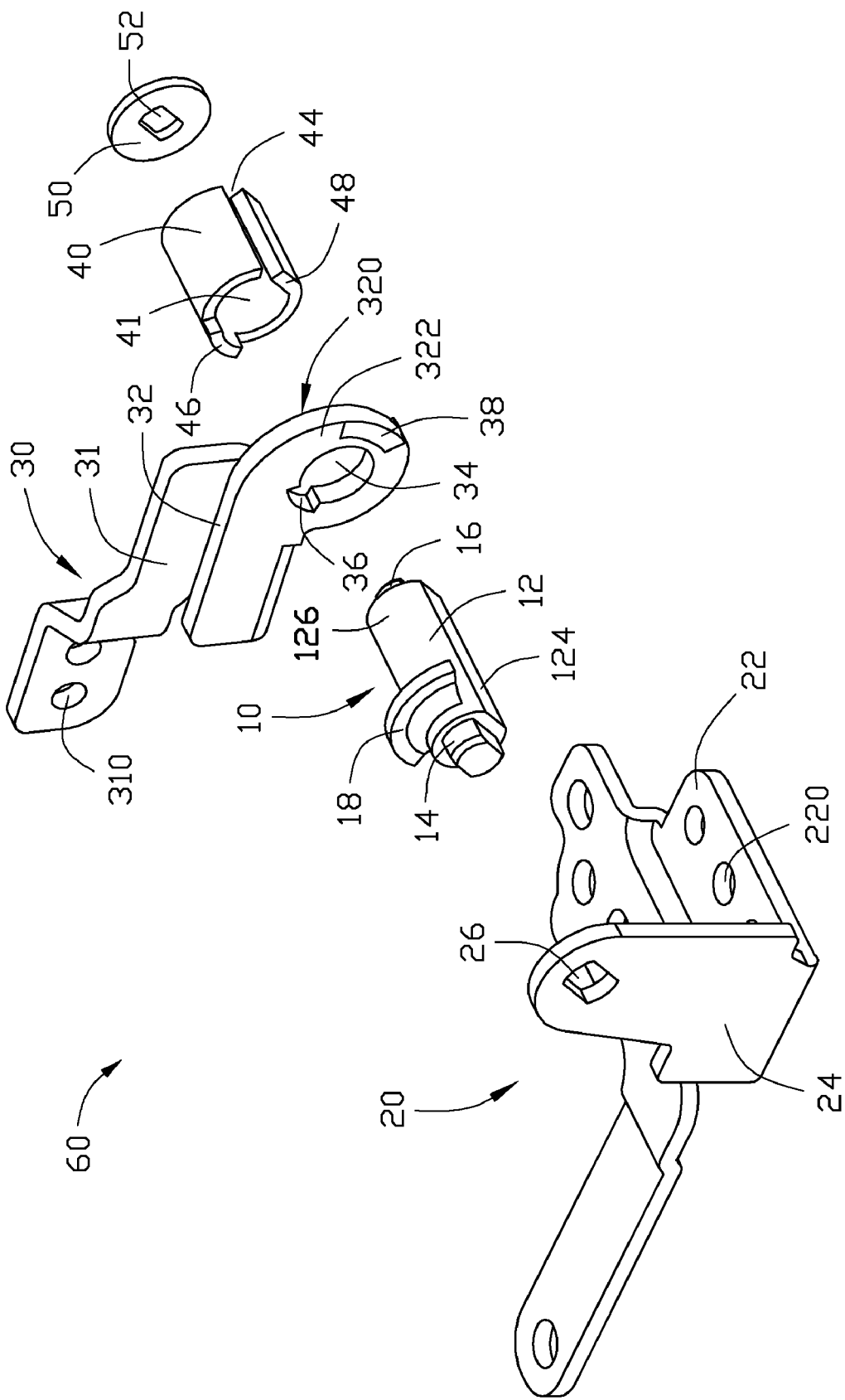
FIG. 1 is an exploded, isometric view of an exemplary embodiment of a hinge, the hinge including a first connecting member and a second connecting member.
Figure 2:
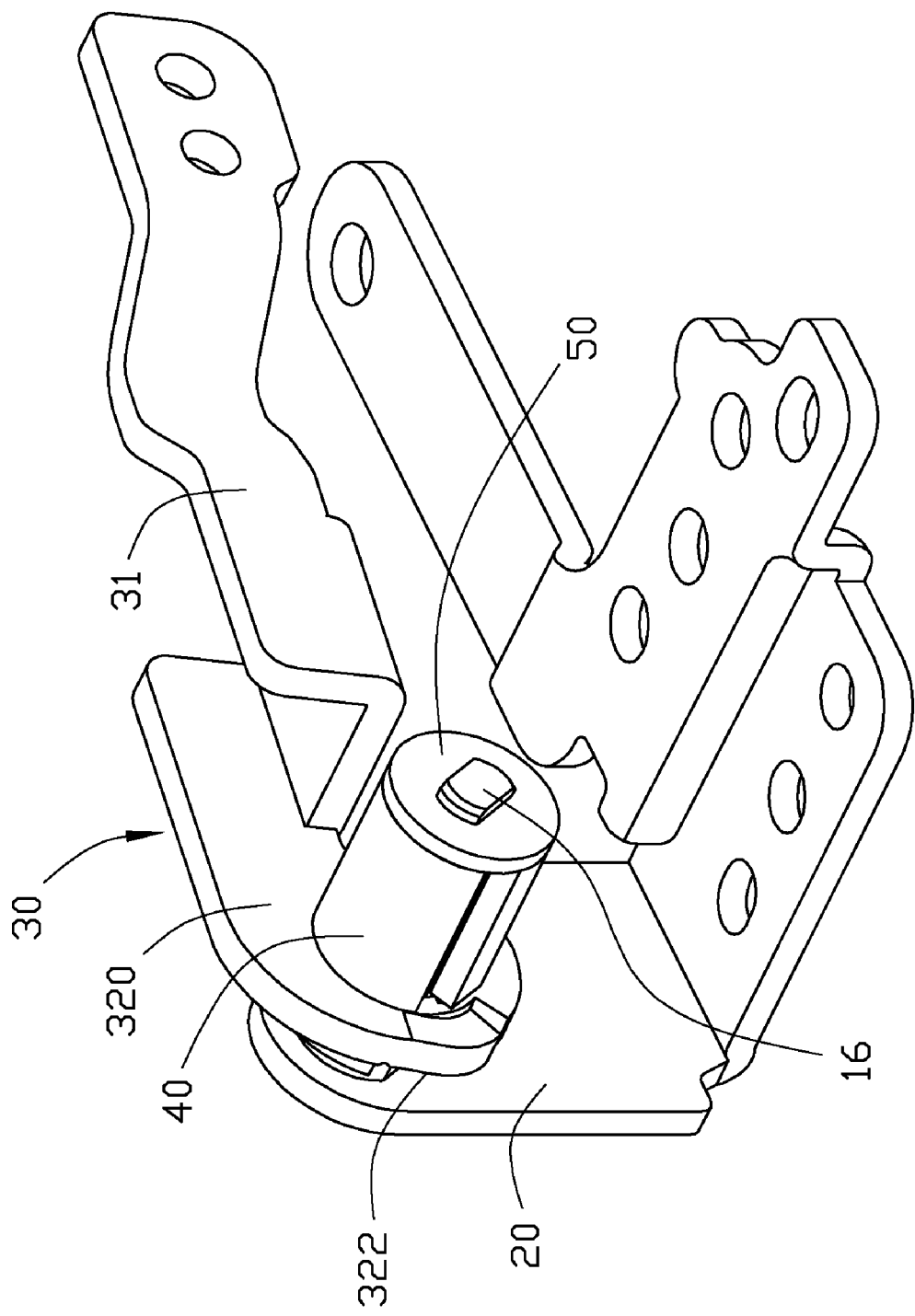
FIG. 2 is an assembled, isometric view of the hinge of FIG. 1.

Referring to FIGS. 1 and 2, an exemplary embodiment of a hinge 60 includes a shaft 10, a first connecting member 20, a second connecting member 30, a shaft sleeve 40 rotatably mounted to the shaft 10, and a friction member 50 fixed to a distal end of the shaft 10. In another embodiment, the hinge 60 further includes a fastener (not shown) fixed to the shaft 10 and resisting against the friction member 50, for preventing the first and second connecting members 20, 30, the shaft sleeve 40, and the friction member 50 from disengaging from the shaft 10.

The shaft 10 includes a shaft body 12 having a D-shaped cross-section, a first fixing portion 14 extending from a first end of the shaft body 12, and a second fixing portion 16 extending from a second end opposite to the first end of the shaft body 12. The shaft body 12 has a greater diameter than thickness of either of the first and second fixing portions 14 and 16. Each of the first and second fixing portions 14, 16 has a double-D shaped cross-section. The shaft body 12 defines a flat surface 124 and a circular portion 126 in a circumference of the shaft body 12. A resisting protrusion 18 protrudes from the circumference of the shaft body 12, neighboring the first fixing portion 14.

The first connecting member 20 includes a connecting portion 22 defining a plurality of fixing holes 220 therein, and a fixing portion 24 perpendicularly extending from a side of the connecting portion 22. The fixing portion 24 axially defines a fixing hole 26 having a double-D shaped cross-section, corresponding to the first fixing portion 14 of the shaft 10, for unrotatably fixing the shaft 10 to the first connecting member 20.

The second connecting member 30 includes a connecting block 31 defining a plurality of fixing holes 310 therein, and a pivoting portion 32 connected to the connecting block 31. The pivoting portion 32 includes a first side surface 320 facing the connecting block 31, and a second side surface 322 opposite to the first side surface 320. A pivot hole 34 extending through the first and second side surfaces 320, 322 is defined in the pivoting portion 32. Thereby, the shaft body 12 of the shaft 10 can pass the pivot hole 34 rotatably to fix the second connecting member 30 to the shaft 10. A fixing hole 36 extending through the first and second side surfaces 320, 322 is defined in the pivoting portion 32 communicating with and located beside the pivot hole 34. A raised portion 38 protrudes from the second side surface 322 and is situated adjacent the pivot hole 34 directly opposite the fixing hole 36, and extends along a circumference of the pivoting portion 32.

The shaft sleeve 40, having a generally C-shaped cross-section, axially defines a receiving hole 41 therein, thereby allowing the shaft body 12 of the shaft 10 to rotate freely relative to the shaft sleeve 40. A cutout 44 is axially defined in the shaft sleeve 40 extending through two opposite ends of the shaft sleeve 40, thereby the shaft sleeve 40 being deformable. The cutout 44 communicates with the receiving hole 41. The shaft sleeve 40 includes a flat resisting block 48 formed beside the cutout 44. A fixing post 46 axially extends from one end of the shaft sleeve 40 opposite to the cutout 44.

The friction member 50 defines a double-D shaped shaft hole 52 corresponding to the second fixing portion 16 of the shaft 10. Thereby, the friction member 50 is capable of being unrotatably mounted to the shaft 10.

Referring also to FIG. 2, in assembly, the first fixing portion 14 of the shaft 10 is fixedly received in the fixing hole 26 of the first connecting member 20, thereby, the shaft 10 is unrotatably fixed to the first connecting member 20. The fixing body 12 of the shaft 10 is rotatably extended through the pivot hole 34 of the second connecting member 30 then the receiving hole 41 of the shaft sleeve 40, with the second fixing portion 16 of the shaft 10 fixedly engaging in the shaft hole 52 of the friction member 50. A distal end of the second fixing portion 16 is riveted to the friction member 50, for preventing the friction member 50, the shaft sleeve 40, and the second connecting member 30 from disengaging from the shaft body 12 of shaft 10. In the aforementioned assembly, the fixing post 46 of the shaft sleeve 40 is fixed in the fixing hole 36 of the second connecting member 30, thereby, the shaft sleeve 40 is unrotatably fixed to the second connecting member 30. Opposite ends of the shaft sleeve 40 resist against the friction member 50 and the first side surface 320 of the second connecting member 30, respectively. The resisting block 48 of the shaft sleeve 40 resists against the flat surface 124 of the shaft 10.

Figure 3:
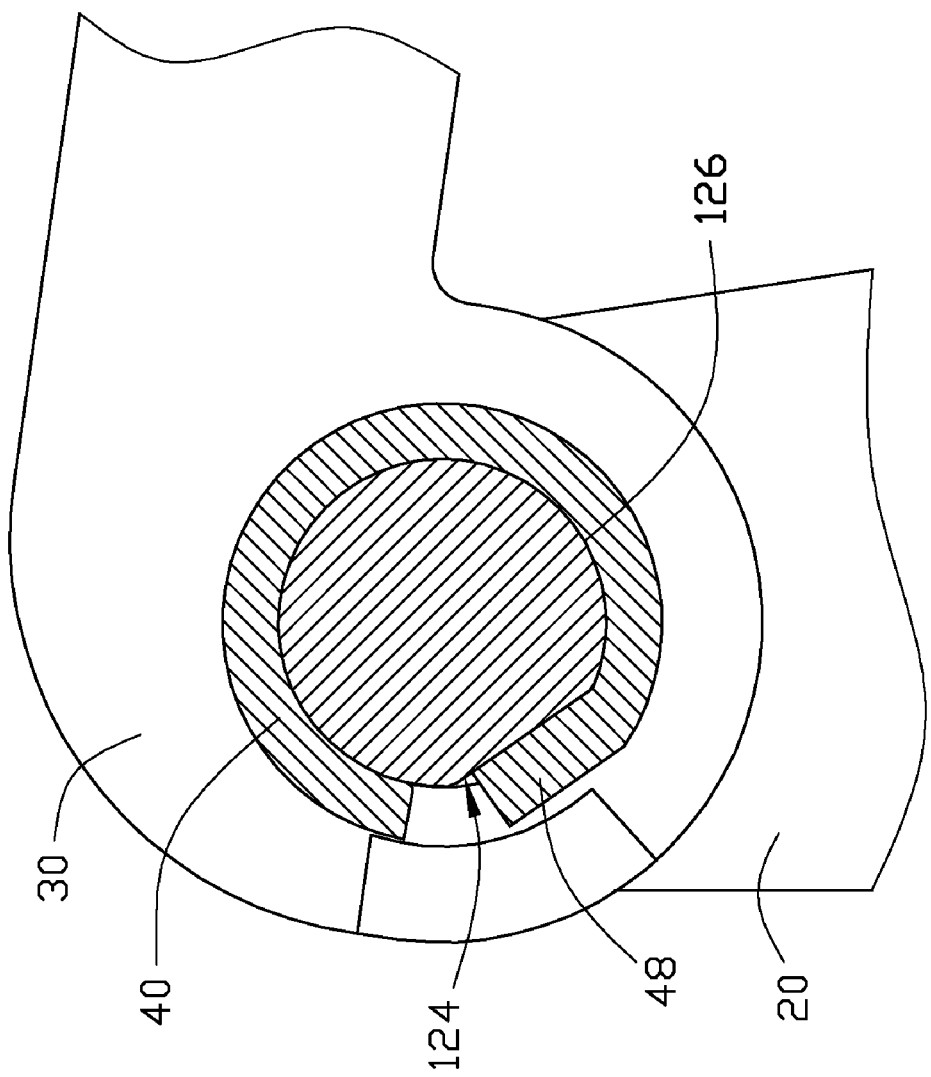
FIG. 3 is an enlarged, sectional partial view of the hinge of FIG. 1.
Figure 4:
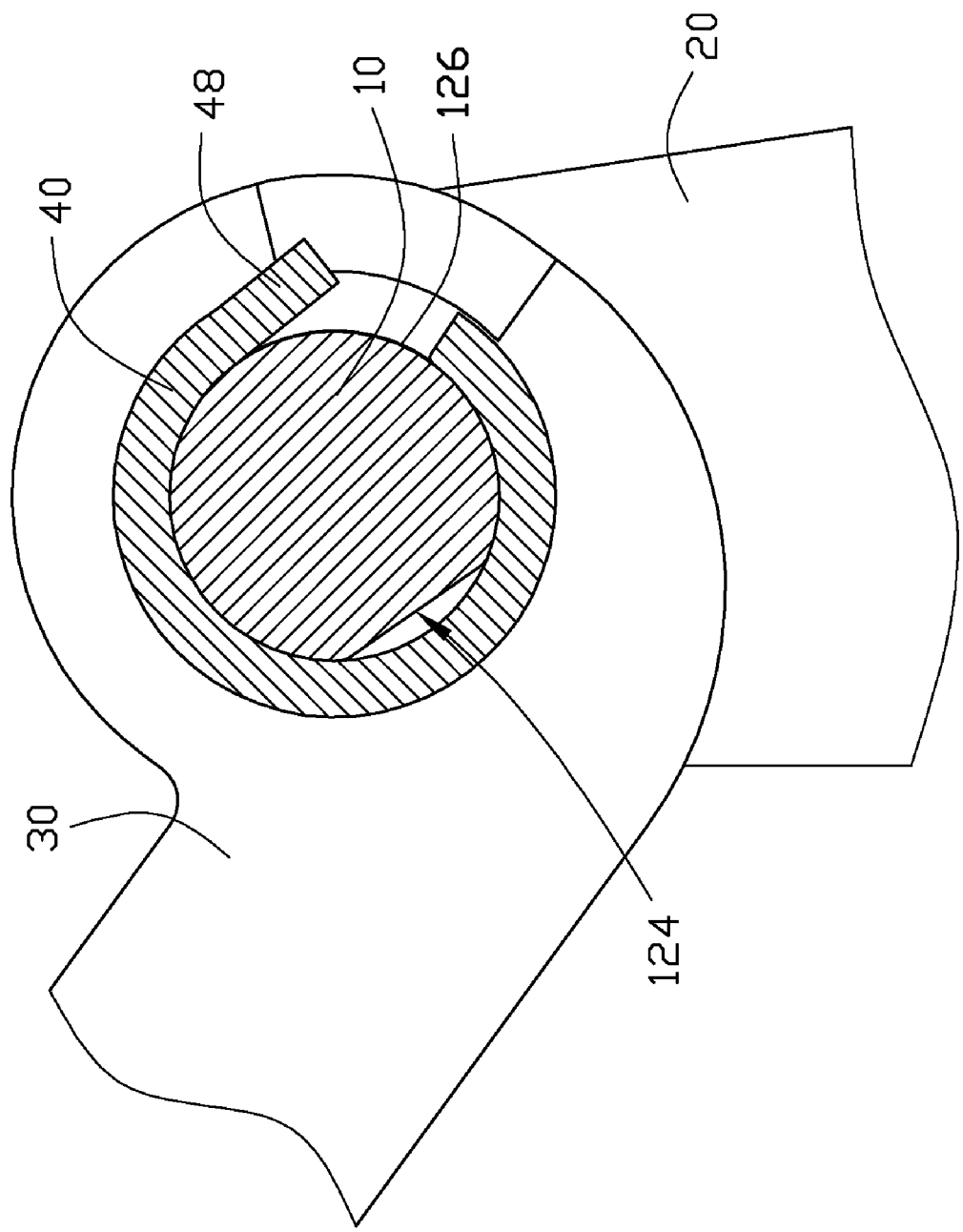
FIG. 4 is similar to FIG. 3, but viewed from another perspective, and showing the second connecting member being rotated an angle relative to the first connecting member.
Figure 5:
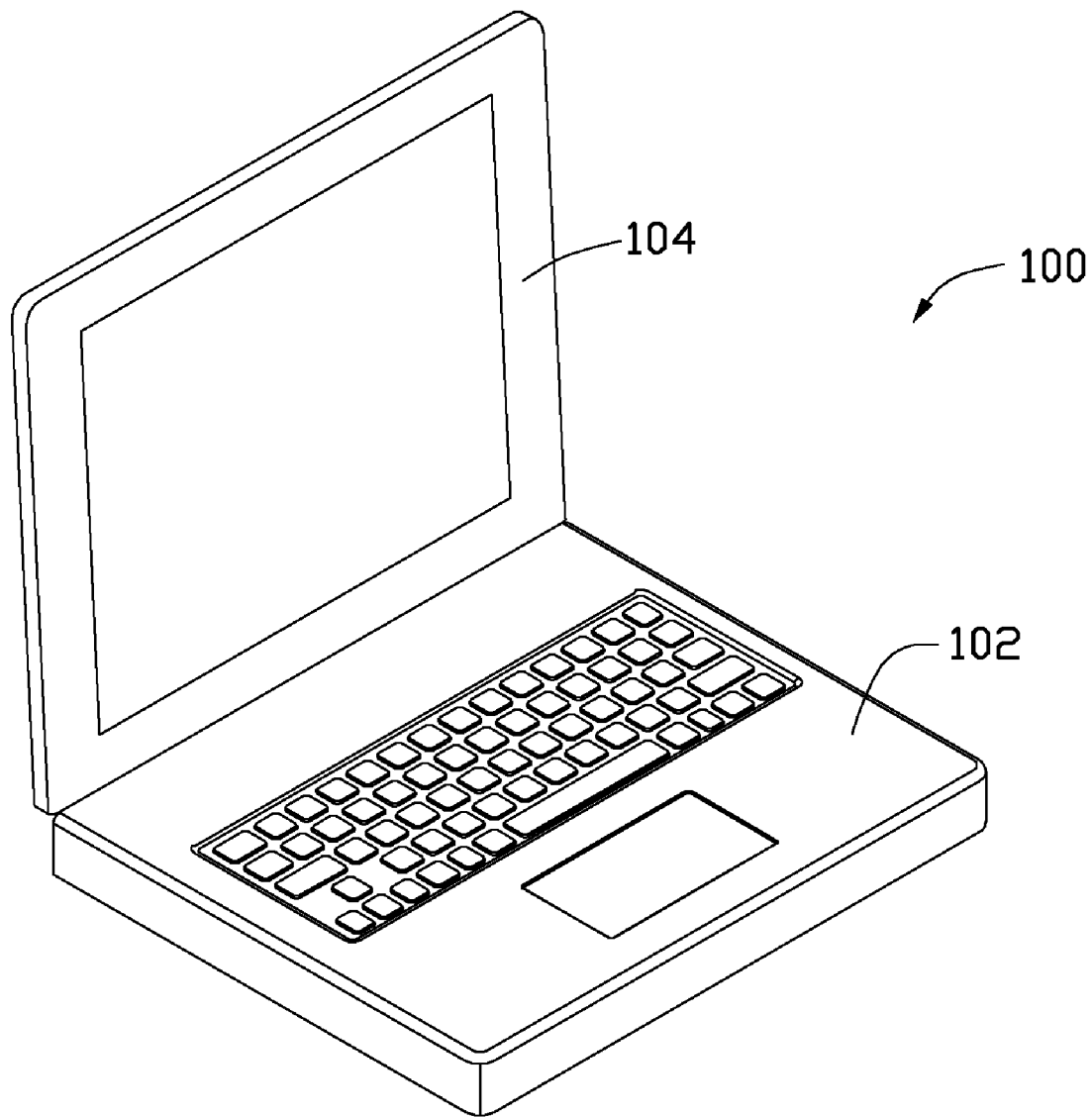
FIG. 5 is an isometric view of an exemplary embodiment of a collapsible device utilizing the hinge of FIG. 1.

Referring to FIGS. 3 to 5, in use, the above-mentioned hinge 60 is utilized in a collapsible device 100, such as a notebook computer, that includes a base 102 and a cover 104. The first connecting member 20 is fixed to one of the cover 104 and the base 102 via the plurality of fixing holes 220, and the second connecting member 30 is fixed to the other one of the cover 104 and the base 102 via the plurality of the fixing holes 310. Therefore, during rotation of the cover 104 relative to the base 102, the second connecting member 30 together with the shaft sleeve 40 rotates relative to the first connecting member 20, and the resisting block 48 is deformed and slide onto the circular portion 126 of the shaft body 12 from the flat surface 124 of the shaft 10. In this process, the shaft sleeve 40 is deformed to clamp the shaft body 12; therefore, much more force is needed to rotate the second connecting member 30 to open the cover 104.

The second connecting member 30 cannot be rotated further when the raised portion 38 of the second connecting member 30 resists against the resisting protrusion 18 of the shaft 10. As a result, the cover 104 cannot be over-rotated.

It is believed that the present embodiment and its advantages will be understood from the foregoing description, and it will be apparent that various changes may be made thereto without departing from the spirit and scope of the description or sacrificing all of its material advantages, the example hereinbefore described merely being exemplary embodiment.

What is claimed is:

1. A hinge comprising:
  a first connecting member;
  a shaft unrotatably fixed to the first connecting member, the shaft comprising a shaft body comprising a flat surface and a circular portion formed on a circumference of the shaft body;
  a second connecting member rotatably mounted to the shaft body; and
    a shaft sleeve unrotatably fixed to the second connecting member, the shaft sleeve comprising a cutout defined therein and a flat resisting block formed beside the cutout, wherein a receiving hole is defined in the shaft sleeve for rotatably receiving the shaft body, the resisting block resisting against the flat surface, when the second connecting member is rotated relative to the first connecting member, the resisting block is deformed, and slides onto the circular portion of the shaft body from the flat surface.

2. The hinge of claim 1, wherein the cutout extends through two opposite ends of the shaft sleeve and communicates with the receiving hole.

3. The hinge of claim 1, wherein the second connecting member defines a fixing hole, a fixing post extends from the shaft sleeve and engages in the fixing hole such that the shaft sleeve is unrotatably fixed to the second connection member.

4. The hinge of claim 3, wherein the second connecting member defines a pivot hole through which the shaft body rotatably passes, thereby the second connecting member is rotatably mounted to the shaft body, the pivot hole communicates with the fixing hole.

5. The hinge of claim 1, wherein a resisting protrusion protrudes from the circumference of the shaft body, a raised portion protrudes from the second connecting member to resist against the resisting protrusion.

6. The hinge of claim 1, wherein a first fixing portion extends from one end of the shaft body, and the first connecting member defines a fixing hole for fixedly receiving the first fixing portion such that the shaft body is unrotatably fixed to the first connecting member.

7. The hinge of claim 6, further comprising a friction member unrotatably mounted to the shaft, wherein a second fixing portion extends from the other end of the shaft body, a distal end of the second fixing portion is riveted to the friction member.

8. A collapsible device comprising:
  a base;
  a hinge comprising:
    a first connecting member;
    a shaft unrotatably fixed to the first connecting member, the shaft comprising a shaft body defining a flat surface and a circular portion on a circumference of the shaft body;
    a second connecting member rotatably mounted to the shaft body;
    a shaft sleeve unrotatably fixed to the second connecting member, the shaft sleeve comprising a cutout defined therein and a flat resisting block formed beside the cutout, wherein a receiving hole is defined in the shaft sleeve for the shaft body rotatably passing therethrough, with the resisting block resisting against the flat surface, when the second connecting member is rotated relative to the first connecting member, the resisting block is deformed, and slides onto the circular portion of the shaft body from the flat surface; and
  a cover, wherein the first connecting member is fixed to one of the base and the cover, and the second connecting member is fixed to the other one of the base and the cover.

9. The collapsible device of claim 8, wherein the cutout extends through two opposite ends of the shaft sleeve and communicates with the receiving hole.

10. The collapsible device of claim 8, wherein the second connecting member defines a fixing hole, a fixing post extends from the shaft sleeve and engages in the fixing hole such that the shaft sleeve is unrotatably fixed to the second connection member.

11. The collapsible device of claim 10, wherein the second connecting member defines a pivot hole through which the shaft body rotatably passes, thereby the second connecting member is rotatably mounted to the shaft body, the pivot hole communicates with the fixing hole.

12. The collapsible device of claim 8, wherein a resisting protrusion protrudes from the circumference of the shaft body, a raised portion protrudes from the second connecting member to resist against the resisting protrusion.

13. The collapsible device of claim 8, wherein a first fixing portion extends from one end of the shaft body, and the first connecting member defines a fixing hole fixedly receiving the first fixing portion such that the shaft body is unrotatably fixed to the first connecting member.

14. The collapsible device of claim 13, further comprising a friction member unrotatably mounted to the shaft, wherein a second fixing portion extends from the other end of the shaft body, a distal end of the second fixing portion is riveted to the friction member.

* * * * *